(12) United States Patent
Ledieu et al.

(10) Patent No.: US 12,438,419 B2
(45) Date of Patent: Oct. 7, 2025

(54) ELECTRIC MOTOR DESIGNED TO ALLOW A BETTER REMOVAL OF THE HEAT GENERATED WHEN IT IS OPERATING

(71) Applicant: NOVARES FRANCE, Velizy-Villacoublay (FR)

(72) Inventors: Cédric Ledieu, Mont Saint Eloi (FR); Maxime Balligand, Harnes (FR)

(73) Assignee: NOVARES FRANCE, Velizy-Villacoublay (FR)

( * ) Notice: Subject to any disclaimer, the term of this patent is extended or adjusted under 35 U.S.C. 154(b) by 151 days.

(21) Appl. No.: 18/286,628

(22) PCT Filed: Apr. 7, 2022

(86) PCT No.: PCT/FR2022/050652
§ 371 (c)(1),
(2) Date: Oct. 12, 2023

(87) PCT Pub. No.: WO2022/219269
PCT Pub. Date: Oct. 20, 2022

(65) Prior Publication Data
US 2024/0380283 A1 Nov. 14, 2024

(30) Foreign Application Priority Data
Apr. 15, 2021 (FR) ..................... 21/03896

(51) Int. Cl.
*H02K 9/197* (2006.01)
*H02K 5/173* (2006.01)
*H02K 5/20* (2006.01)
(52) U.S. Cl.
CPC ........... *H02K 9/197* (2013.01); *H02K 5/1732* (2013.01); *H02K 5/203* (2021.01)

(58) Field of Classification Search
CPC ...... H02K 9/197; H02K 5/1732; H02K 5/203; H02K 5/15
See application file for complete search history.

(56) References Cited

U.S. PATENT DOCUMENTS

| 8,653,704 B2 | 2/2014 | Atarashi et al. | |
| 2019/0386537 A1* | 12/2019 | Dib | .......... H02K 7/083 |
| 2020/0373814 A1 | 11/2020 | Dircks | |

FOREIGN PATENT DOCUMENTS

| CN | 104685769 A | 6/2015 |
| CN | 111756133 A | 10/2020 |

(Continued)

OTHER PUBLICATIONS

International Search Report for corresponding application PCT/FR2022/050562 filed Apr. 7, 2022; Mail date Jun. 17, 2022.

*Primary Examiner* — Tulsidas C Patel
*Assistant Examiner* — Mohammed Ahmed Qureshi
(74) *Attorney, Agent, or Firm* — CANTOR COLBURN LLP

(57) ABSTRACT

The invention relates to an electric motor (10) comprising a rotor (11) mounted on a shaft (12), a stator (13) positioned around the rotor (11), the stator (13) comprising a body formed by a stack of laminations (2) and winding overhangs (19) projecting axially from each side of the stator body, a front bearing (14) and a rear bearing (15) which are connected to one another, the front and rear bearings (14, 15) forming an internal cavity in which the rotor (11) and the stator (13) are housed, wherein the rear bearing (15) is bell-shaped and covers a cylindrical part (142) of the front bearing (14) extending axially from an end wall (141) of the front bearing (14), the rear bearing (15) forming, with the front bearing (14), an internal duct (9) for the circulation of a first cooling fluid inside which duct a first cooling fluid circulates, the first cooling circuit entering the internal duct (Continued)

(9) via a first fluid-inlet duct (26) formed radially through the rear bearing (15) and exiting the internal duct (9) via a first fluid-outlet duct (27) formed radially through the rear bearing (15), characterized in that the front bearing (14) has a projecting rib (28) extending radially towards an internal face (152) of the rear bearing (15), said rib (28) acting as a separator for the internal duct (9), the first fluid-inlet and fluid outlet ducts (26, 27) opening respectively on each side of the rib (28), and in that the electric motor (10) is additionally cooled by a second cooling fluid circulating through the stack of laminations (2) of the stator (13) and over the winding overhangs (19) of the stator (13), the second cooling fluid being supplied via at least a second fluid-inlet duct (31), the at least one second fluid-inlet duct (31) being at least partially formed through the rib (28) of the front bearing (14).

9 Claims, 4 Drawing Sheets

(56) References Cited

FOREIGN PATENT DOCUMENTS

| | | | |
|---|---|---|---|
| CN | 212412862 U | * | 1/2021 |
| DE | 102014117382 A1 | | 6/2016 |
| DE | 102016110658 A1 | | 12/2017 |
| WO | 2021104970 A1 | | 6/2021 |

* cited by examiner

ELECTRIC MOTOR DESIGNED TO ALLOW A BETTER REMOVAL OF THE HEAT GENERATED WHEN IT IS OPERATING

TECHNICAL FIELD

The disclosure concerns an electric motor arranged to allow better removal of the heat generated during its operation.

BACKGROUND

In general, the current electric motors include a rotor secured to a shaft and a stator which surrounds the rotor. The stator is mounted in a casing which includes bearings for the rotational mounting of the shaft. The rotor includes a body formed by a lamination bundle or polar wheels (claw pole) held in the form of a stack by means of a suitable fastening system. The body of the rotor includes inner cavities housing permanent magnets. The stator includes a body consisting of a lamination bundle forming a crown, whose internal face is provided with teeth delimiting two by two a plurality of slots open towards the inside of the stator body and intended to receive phase windings. These phase windings pass through the slots of the stator body and form winding heads projecting on either side of the stator body. The phase windings can for example consist of a plurality of U-shaped conductor segments, the free ends of two adjacent segments being connected to each other by welding.

In the rotor, the lamination stack is clamped axially between a front flange and a rear flange mounted coaxially with the shaft. Each flange has the overall shape of a disc extending in a radial plane perpendicular to the axis of the shaft. Each flange includes a central orifice for the coaxial mounting on the shaft and several through holes intended to receive fastening screws passing axially through the whole of the lamination stack, said screws being secured to the flanges by means of nuts. The front and rear flanges are generally formed of a non-magnetic, heat-conducting material, for example a metal.

The casing generally includes a front and rear bearings assembled together. The bearings define an inner cavity in which the rotor and stator are housed. Each of the bearings centrally carries a ball bearing for the rotational mounting of the rotor shaft.

During motor operation, the current flowing through the phase windings of the stator generates significant heat that must be removed. To cool the stator, there are currently several solutions. One of these solutions consists in providing a cooling circuit inside the bearing with which the stator is shrunk, a cooling liquid circulating inside the cooling circuit making it possible to remove the heat generated by the stator via the bearing. Nonetheless, this solution has the draw back of only allowing cooling of the stator at the level of the surfaces of the lamination stack which is in contact with the cooled bearing. This solution therefore does not allow optimum cooling of the motor. Another existing solution consists of circulating oil through the rotor shaft and then circulating this oil along the stator body so that it is in contact with the winding heads of the phase windings. Such a solution, nonetheless, requires the provision of numerous modifications to the structure of the motor, which makes it difficult to implement, and therefore relatively expensive. Other solutions have also been described in documents CN 212 412 862 U and US 2019/386537.

The disclosure therefore aims to provide an electric motor arranged to allow better removal of the heat generated during its operation and does not have the draw backs of the existing solutions described above.

BRIEF SUMMARY

To this end, the disclosure concerns an electric motor comprising a rotor mounted on a shaft, a stator arranged around the rotor, said stator comprising a body formed by a lamination stack and winding heads projecting axially on either side of the stator body, a front bearing and a rear bearing connected to each other, said front and rear bearings forming an inner cavity in which the rotor and the stator are housed, in which the rear bearing is bell-shaped and covers an annular part of the front bearing extending axially from an end wall of said front bearing, the rear bearing forming with the front bearing an inner circulation channel of a first cooling fluid inside which circulates a first cooling fluid, said first cooling fluid entering the inner channel through a first fluid inlet channel formed radially through the rear bearing and exiting the inner channel through a first fluid outlet channel formed radially through the rear bearing, characterized in that the front bearing has a projecting rib extending radially towards an inner face of the rear bearing, said rib forming a separator for the inner channel, said first fluid inlet and outlet channels opening respectively on either side of said rib, and by the fact that the electric motor is also cooled by a second cooling fluid circulating in the lamination stack of the stator and on the winding heads of the stator, said second cooling fluid being supplied via at least one second fluid inlet channel, said at least one second fluid inlet channel being at least partially formed through the rib of the front bearing.

Thus configured, the electric motor can be cooled both by a first cooling fluid circulating between the front and rear bearings and by a second cooling fluid circulating inside the lamination stack so as to be in contact with the stator, and in particular with the winding heads of the phase windings of the stator. A better removal of the heat generated by the motor during its operation can thus be obtained. This double cooling circuit is possible due to the presence of a separator at the level of the front bearing, which makes it possible, on the one hand, to separate the inlet and outlet channels of the first cooling fluid, and, on the other hand, to provide an extra thickness to the outer periphery of the front bearing that is large enough to allow the formation of the inlet channel for the second cooling fluid. This separator therefore prevents the inner fluid circulation channel from being interrupted at one or more places to allow the passage of the inlet channel of the second cooling fluid. Such a solution would in fact have the drawback of requiring the addition of additional sealing means so as to prevent the infiltration of the second cooling fluid into the circuit of the first cooling fluid and vice versa.

According to other characteristics, the motor of the disclosure includes one or more of the following optional characteristics considered alone or in combination:

the second cooling fluid exits the inner cavity via at least one second fluid outlet channel, said at least one second fluid outlet channel being at least partially formed by an axial groove extending along an inner face of the front bearing adjoining the stator, said axial groove fluidly communicating with an outlet orifice formed through the rear bearing.

the outlet orifice is formed axially through an end wall of the rear bearing.

said at least one second fluid inlet channel is in fluid communication with at least one fluid circulation channel formed inside the stator, said at least one fluid circulation channel opening at one of its ends in a front intermediate space axially separating the end wall of the front bearing of the stator and at another of its ends in a rear intermediate space axially separating an end wall of the rear bearing of the stator.

the rear bearing is equipped with a fluid inlet pipe communicating with the first fluid inlet channel and with a fluid outlet pipe communicating with the first fluid outlet channel.

the front bearing is equipped with at least one fluid inlet pipe communicating with said at least one second fluid inlet channel.

annular seals are housed at least partially inside annular grooves formed on the outer periphery of the cylindrical part of the front bearing, on either side of the inner fluid circulation channel.

the first cooling fluid is selected from air, glycol water or an oil.

the second cooling fluid is selected from air or an oil.

BRIEF DESCRIPTION OF THE DRAWINGS

The disclosure will be better understood on reading the non-limiting description which follows, made with reference to the appended figures.

DETAILED DESCRIPTION

Figure 1:
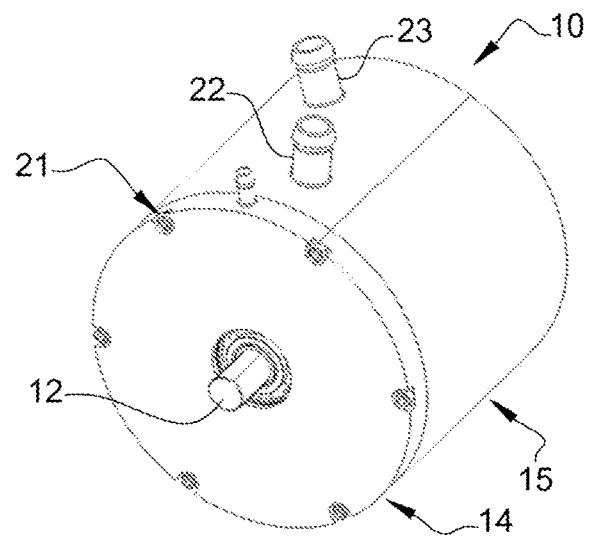
FIG. 1 is a perspective view of an electric motor according to a particular embodiment of the disclosure.
Figure 2:
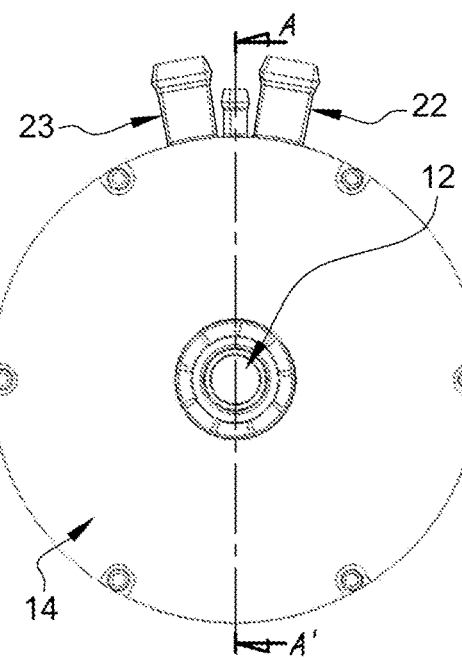
FIG. 2 is a front view of the motor of FIG. 1.
Figure 3:
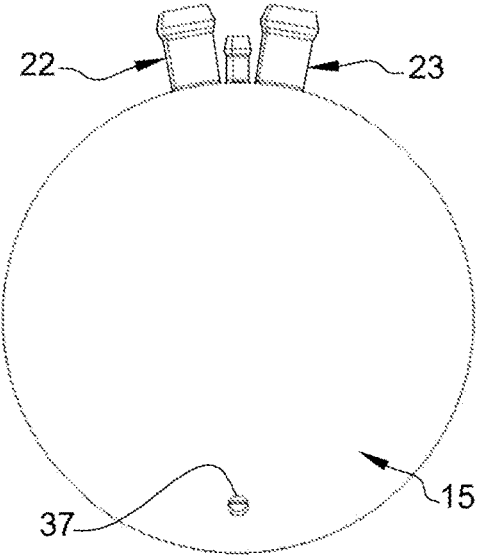
FIG. 3 is a rear view of the motor of FIG. 1.
Figure 4:
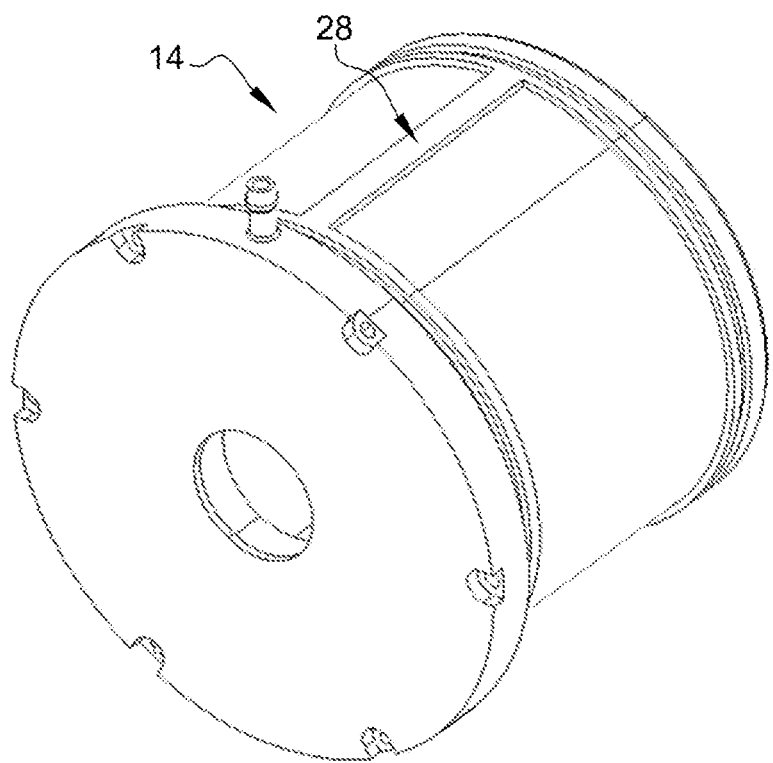
FIG. 4 is a front perspective view of the front bearing equipping the motor of FIG. 1.
Figure 5:
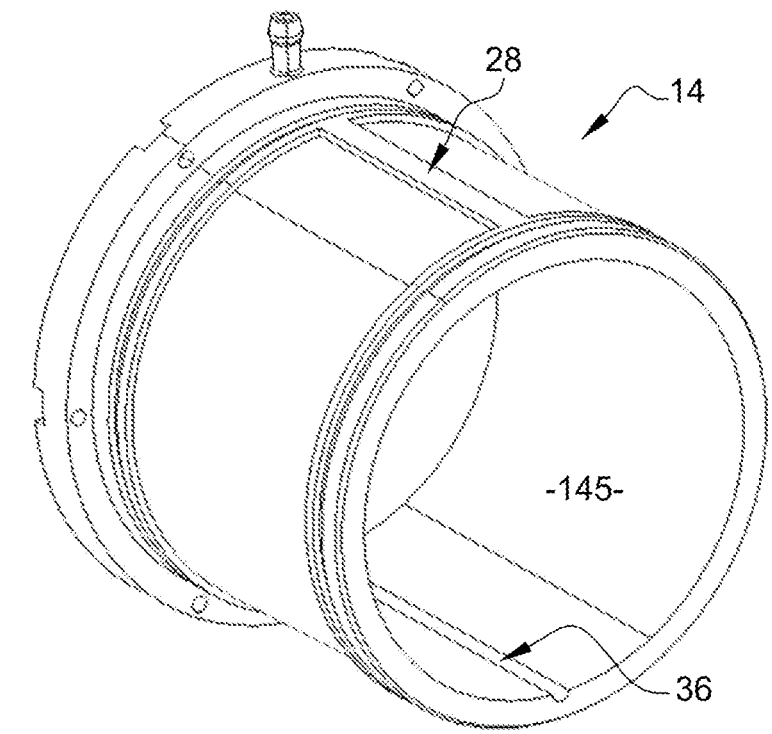
FIG. 5 is a rear perspective view of the bearing shown in FIG. 4.

FIGS. 1 to 3 show an electric motor 10 according to the disclosure comprising two bearings, respectively a front bearing 14 and a rear bearing 15, connected to each other, in particular by means of screws 21, the rear bearing 15 housing and almost completely covering the front bearing 14.

Figure 8:
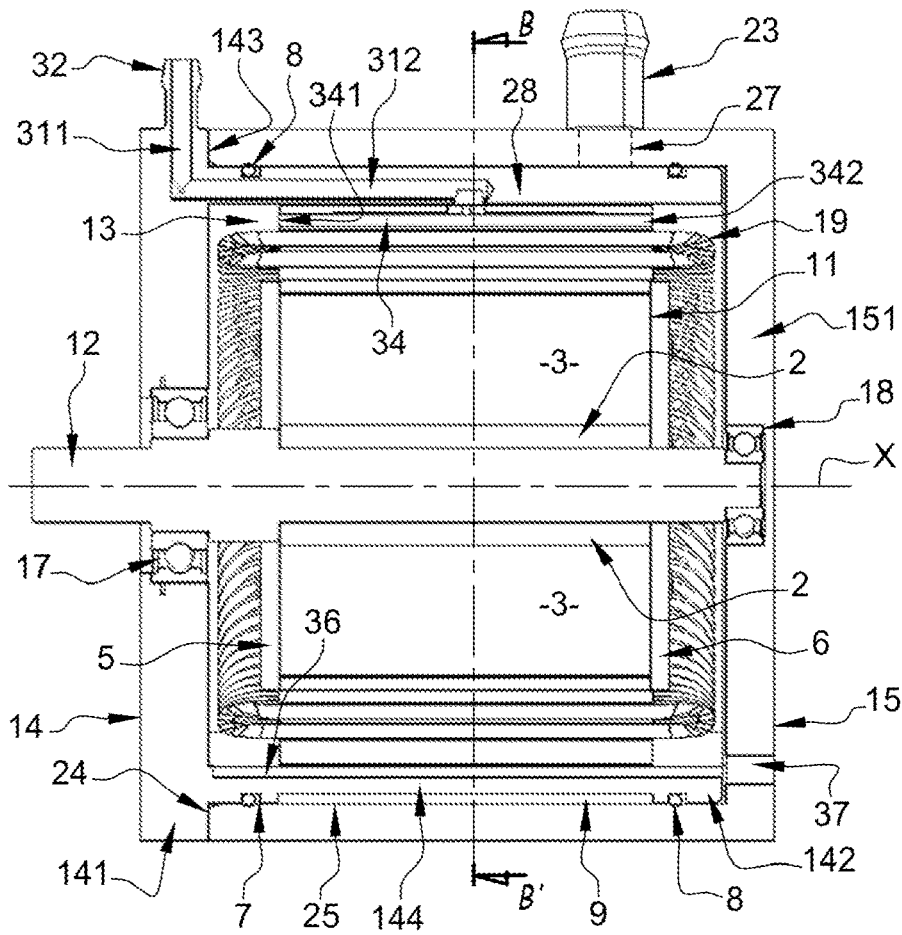
FIG. 8 is a sectional view of the motor of FIG. 1 along the section line AA.
Figure 9:
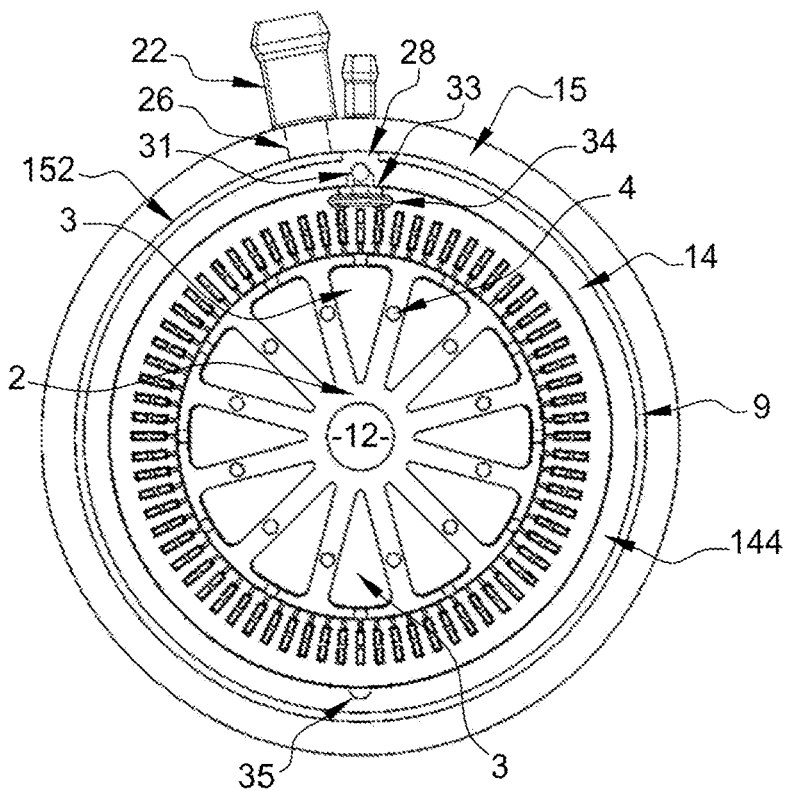
FIG. 9 is a sectional view of the motor of FIG. 1 along the section line BB.

As illustrated in FIGS. 8 and 9, the front bearing 14 comprises a casing in which are housed a rotor 11 secured in rotation to a shaft 12 and an annular stator 13 which surrounds the rotor 11 coaxially with the shaft 12. The stator 13 will advantageously be shrunk inside the front bearing 14. The bearings 14, 15 are hollow and form an inner cavity in which the rotor 11 and the stator 13 are housed. Each of the bearings 14, 15 centrally carries a ball bearing, respectively 17 and 18, for the rotational mounting of the shaft 12. Winding heads 19 project axially from either side of the stator body 13 and are housed in the intermediate space separating the stator 13 from the respective bearings 14, 15. The front and rear bearings 14, 15 will advantageously be made of metal. In an advantageous configuration of the disclosure, the front bearing 14 will be made of aluminum, while the rear bearing 15 will consist of a steel ring screwed onto the front bearing 14 and housing a rear bearing of the shaft 12 of the rotor, the rear bearing 15 and part of the front bearing 14 being covered by a cover made of a material with low thermal conductivity, such as a plastic material for example.

In the shown embodiment, the rotor 11 comprises a body formed by a lamination stack 2 made of a ferromagnetic material, in particular steel, as well as a plurality of permanent magnets 3 intended to be housed in a plurality of inner cavities formed inside the lamination stack 2, each inner cavity housing a permanent magnet 3. The lamination stack 2 is mounted coaxially on the shaft 12 rotatably mounted about an axis X. The shaft 12 can be force fitted inside a central opening of the lamination stack 2 so as to rotatably connect the body of the rotor with the shaft 12.

The lamination stack 2 is formed by an axial lamination bundle which extend in a radial plane perpendicular to the axis X of the shaft 12. A plurality of fastening holes 4 are made in the lamination stack 2 to allow the passage of fastening screws of the laminations of the stack. These fastening holes 4 are through so that it is possible to pass a screw inside each hole 4. A first end of the screws bears against the outer face of a front end flange 5, while the other end of the screws cooperates with a nut bearing against the outer face of a rear end flange 6. Thus, the lamination stack 2 is clamped axially between the front end flange 5 and the rear end flange 6. These flanges 5, 6 make it possible to ensure a balancing of the rotor 11 while allowing a good maintenance of the magnets 3 inside their respective cavity. The balancing can be done by adding or removing material. The removal of material can be carried out by machining, while the addition of material can be carried out by implanting elements in openings provided for this purpose and distributed along the circumference of the flanges 5, 6.

The rear bearing 15 consists of a bell-shaped cover which, in the mounted position of the motor shown in FIG. 1, covers a cylindrical portion 142 of the front bearing 14 which extends axially from an end wall 141 of said front bearing 14, said wall 141 having the shape of a disc aligned in a plane perpendicular to the axis X of the shaft 12. The rear bearing 15 rests at an end edge 24 on a shoulder 143 defined by the end wall 141.

The rear bearing 15 has a shape substantially complementary to that of the cylindrical part 142 of the front bearing 14 so that, in the mounted position of the motor, this part 142 is in sealed contact with the inner wall 25 of the rear bearing 15, the sealing being ensured by two seals 8 of annular shape which are housed inside two annular grooves 7 formed at the periphery of the part 142. The grooves 7 are arranged on either side of a thinnest annular zone 144 of the part 142.

The annular zone 144 forms with the inner wall 25 of the rear bearing 15 an inner circulation channel 9 of a first fluid, said channel 9 having a substantially cylindrical shape whose axis is parallel to the axis X defined by the shaft 12 of the rotor 11. The channel 9 thus allows the circulation of a first cooling fluid, such as for example glycol water, around the cylindrical part 142 of the front bearing 14. Thus, during operation of the motor 1, the heat generated by the stator 13 and transmitted to the front bearing 14 can be directly transferred to the first cooling fluid circulating in the inner channel 9. A faster cooling of the stator 13 can thus be obtained. The transfer of heat to the first cooling fluid is further improved in the case where the front bearing 14 is made of a material having a high thermal conductivity, such as aluminum for example, and the rear bearing 15 is made of a steel ring screwed onto the front bearing 14 and housing a rear bearing of the shaft 12 of the rotor, the rear bearing 15 and part of the front bearing 14 being covered by a cover made of a material with low thermal conductivity, such as a plastic material for example. The first cooling fluid penetrates inside the inner channel 9 via an inlet channel 26 of the first fluid formed radially through the rear bearing 15 and opening into the inner channel 9. This first cooling fluid exits from the inner channel 9 via an outlet channel 27 of the first fluid formed radially through the rear bearing 15 and also opening into the inner channel 9. The supply of first cooling fluid will take place through a first fluid inlet pipe 22 disposed at the outer periphery of the rear bearing 15, said first inlet pipe 22 communicating with the inlet channel 26 of the first fluid and the exit of the first cooling fluid will be through a fluid outlet pipe 23 disposed at the outer periphery of the rear bearing 15, said outlet pipe 23 communicating with the outlet channel 27 of the first fluid.

Figure 6:
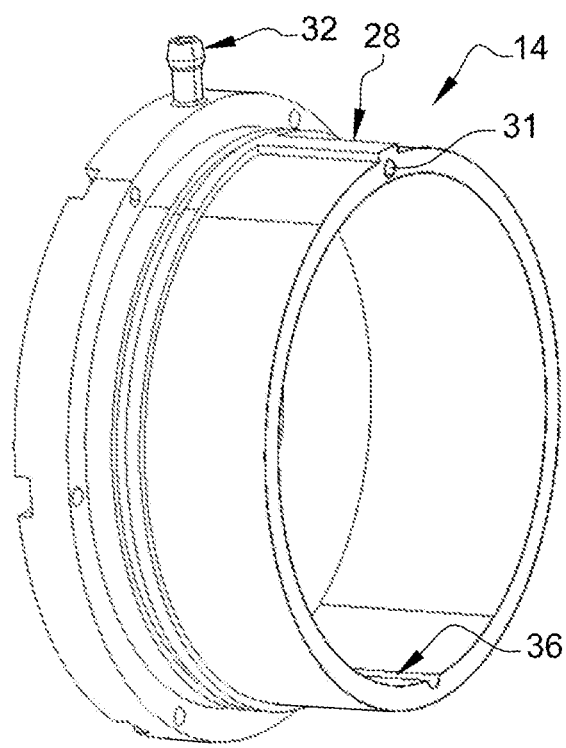
FIG. 6 is a view similar to FIG. 5, the front bearing having been partially truncated on its rear part.
Figure 7:
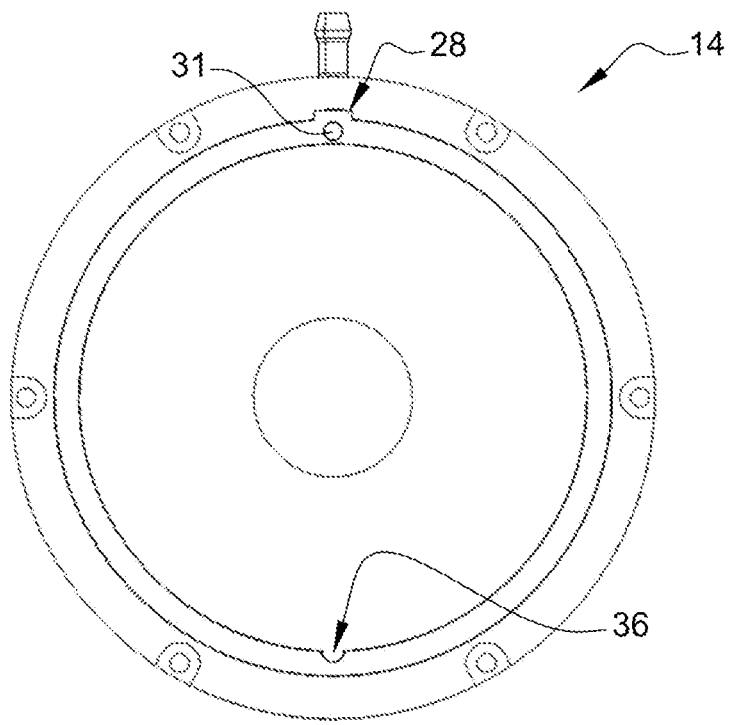
FIG. 7 is a rear view of the bearing shown in FIG. 6.

As illustrated in FIGS. 4, 5 and 8, 9, the front bearing 14 is provided with a projecting rib 28 extending radially in the direction of an inner face 152 of the rear bearing 15, said rib 28 forming a separator for the inner channel 9, said inlet and outlet channels 26, 27 of the first fluid emerging respectively on either side of said rib 28. This rib 28 therefore creates an extra thickness in the cylindrical part 142 of the front bearing 14. As shown in FIGS. 6 and 7, this additional thickness is sufficient to allow the passage of a second fluid inlet channel 31 through the front bearing 14. This second fluid inlet channel 31 has a first section 311 oriented radially and a second section 312 oriented axially. The first section 311 opens at the outer periphery of the end wall 141 of the front bearing 14 at the level of a second fluid inlet pipe 32. The second section 312 communicates with a through hole 33 formed radially through the lamination stack 2 of the stator 13, said through hole 33 opening into a fluid circulation channel 34 formed axially inside the stator 13. This fluid circulation channel 34 opens at one of its ends 341 into a front intermediate space axially separating the end wall 141 of the front bearing 14 of the stator 14 and at another end 342 in a rear intermediate space axially separating an end wall 151 of the rear bearing 15 of the stator 13. Thus, a second cooling fluid, such as oil or air, can circulate inside the electric motor 10 in addition to the cooling circuit by means of the first cooling fluid. This second cooling fluid can thus be supplied via the second inlet pipe 32 and will circulate successively in the second fluid inlet channel 31, then in the fluid circulation channel 34, to finally circulate along the stator 13, in particular by being in contact with the winding heads 19. An improved cooling will thus be possible compared to a motor only traversed on its periphery by a single cooling fluid.

Once heated in contact with the stator 13, the second cooling fluid circulates along a second fluid outlet channel 35 extending along the outer periphery of the stator 13. This second fluid outlet channel 35 is at the least partially formed by a groove 36 extending axially along an inner face 145 of the front bearing 14 adjoining the stator 13. This groove 36 communicates with an outlet orifice 37 formed through the end wall 151 of the rear bearing 15. The second cooling fluid can therefore exit from the electric motor 10 via this outlet orifice 37.

The disclosure is obviously not limited to the configuration of the disclosure as described above.

The invention claimed is:
1. An electric motor comprising
a rotor mounted on a shaft,
a stator disposed around the rotor,
said stator comprising a body formed by a lamination stack and winding heads projecting axially on either side of the body of the stator, a front bearing and a rear bearing connected to each other,
said front and rear bearings forming an inner cavity in which the rotor and the stator are housed, in which the rear bearing is bell-shaped and covers a cylindrical part of the front bearing extending axially from an end wall of said front bearing,
the rear bearing forming with the front bearing an inner channel for the circulation of a first cooling fluid inside which a first cooling fluid circulates,
said first cooling fluid penetrating inside the inner channel via a first fluid inlet channel formed radially through the rear bearing and exiting the inner channel via a first fluid outlet channel formed radially through the rear bearing,
wherein the front bearing has a projecting rib extending radially towards an inner face of the rear bearing, said rib forming a separator for the inner channel, the said first fluid inlet and outlet channels emerging respectively on either side of the said rib, and
wherein the electric motor is also cooled by a second cooling fluid circulating in the lamination stack of the stator and on the winding heads of the stator, said second cooling fluid being supplied through at least one second fluid inlet channel, said at least one second fluid inlet channel being at least partially formed through the rib of the front bearing.

2. The motor according to claim 1, wherein the second cooling fluid leaves the inner cavity via at least one second fluid outlet channel, said at least one second fluid outlet channel being at least partially formed by an axial groove extending along an inner face of the front bearing adjoining the stator, said axial groove fluidly communicating with an outlet orifice formed through the rear bearing.

3. The motor according to claim 2, wherein the outlet orifice is formed axially through an end wall of the rear bearing.

4. The motor according to claim 1, wherein said at least one second fluid inlet channel is in fluid communication with at least one fluid circulation channel formed inside the stator, said at least one fluid circulation channel opening at one of its ends into a front intermediate space axially separating the end wall from the front bearing of the stator and at another of its ends in a rear intermediate space axially separating an end wall of the rear bearing from the stator.

5. The motor according to claim 1, wherein the rear bearing is equipped with a fluid inlet pipe communicating with the first fluid inlet channel and a fluid outlet pipe communicating with the first fluid outlet channel.

6. The motor according to claim 1, wherein the front bearing is equipped with at least one fluid inlet pipe communicating with said at least one second fluid inlet channel.

7. The motor according to claim 1, wherein the annular seals are housed at least partially inside annular grooves formed at the outer periphery of the cylindrical part of the front bearing, on either side of the inner fluid circulation channel.

8. The motor according to claim 1, wherein the first cooling fluid is selected from air, glycol water or an oil.

9. The motor according to claim 1, wherein the second cooling fluid is selected from air or an oil.

* * * * *